(No Model.) 2 Sheets—Sheet 1.

J. S. DAVIS.
SEEDER AND PLANTER.

No. 431,842. Patented July 8, 1890.

WITNESSES
T. W. Fowler
W. H. Patterson

INVENTOR
John S. Davis,
by A. H. Evans & Co
Attorneys (No Model.) 2 Sheets—Sheet 2.
J. S. DAVIS.
SEEDER AND PLANTER.
No. 431,842. Patented July 8, 1890.
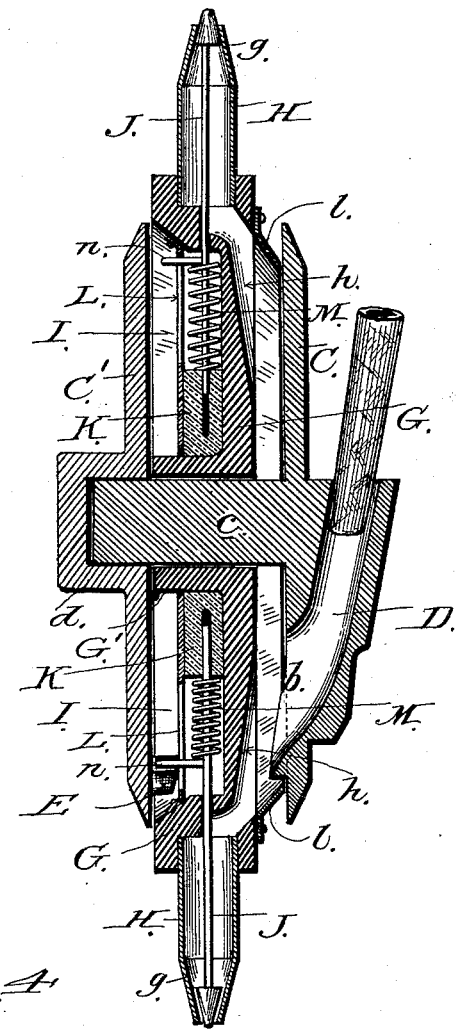
Fig. 2.
Fig. 4.
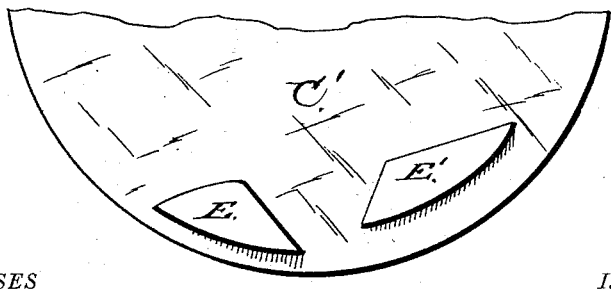
WITNESSES
P. W. Fowler
W. H. Patterson
INVENTOR
John S. Davis,
by A. H. Evans & Co.
Attorneys

UNITED STATES PATENT OFFICE.

JOHN S. DAVIS, OF MONTGOMERY, ALABAMA, ASSIGNOR OF ONE-HALF TO DANIEL S. TROY, OF SAME PLACE.

SEEDER AND PLANTER.

SPECIFICATION forming part of Letters Patent No. 431,842, dated July 8, 1890.

Application filed February 21, 1890. Serial No. 341,285. (No model.)

*To all whom it may concern:*

Be it known that I, JOHN S. DAVIS, a citizen of the United States, residing at Montgomery, in the county of Montgomery and State of Alabama, have invented certain new and useful Improvements in Seeders and Planters, of which the following is a full and clear description, reference being had to the accompanying drawings, forming part of this specification, in which—

Figure 1:
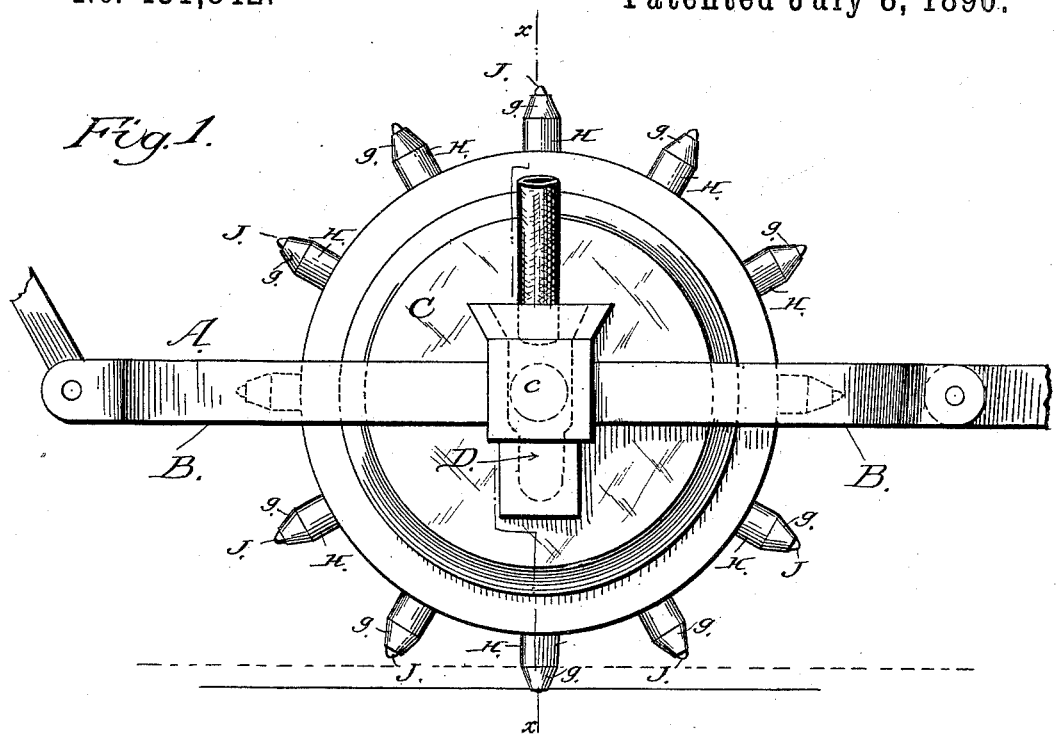
Figure 3:
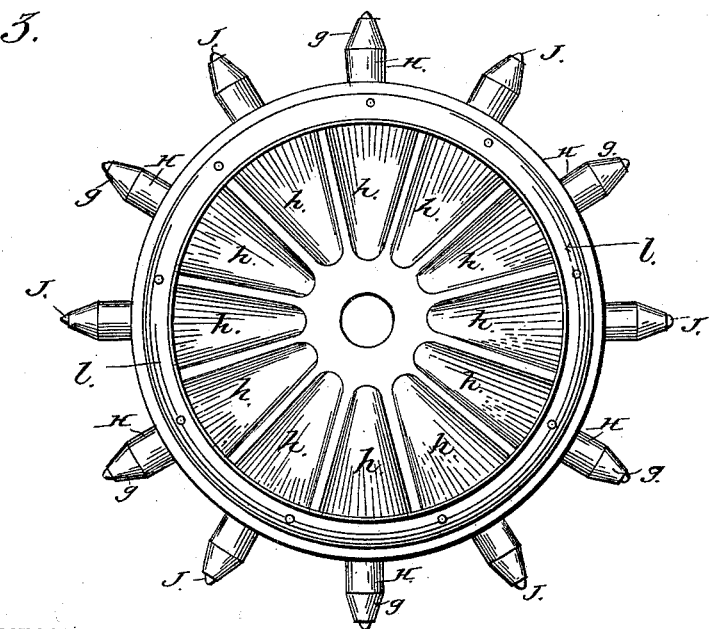

Figure 1 is a side elevation of my improved seeder and planter. Fig. 2 is a transverse sectional view of the same on the line $x\ x$ of Fig. 1. Fig. 3 is a detail showing the inner face of one of the disks. Fig. 4 is a detail to be referred to.

My invention relates to that class of seeders and planters in which spring-actuated plungers are employed to open the discharge end of the seed-planting tube, whereby the seed is deposited in the pocket or holes in the ground formed by the planting-tube; and my invention consists in the constructions and combinations of devices, which I shall hereinafter fully describe and claim.

Referring to the drawings for a more complete explanation of my invention, A indicates a light and yet substantial frame-work, consisting of two parallel bars B, whose rear ends are secured to handles or other means for raising the planting-tubes out of the ground, and whose front ends may be secured to drag-bars or other well-known means, to which any well-known form of draft appliances may be secured. These drag-bars and draft appliances are not shown, as they form no part of the present invention. These parallel bars B have secured to their inner sides near the central portion circular disks C C', one of which C has fitted to it a seed-tube D, which connects with a gum tube leading from the seed-hopper above. This seed-hopper is not shown, as it forms no part of the invention. The tube D communicates at its lower end with a passage or opening $b$, formed through the lower portion of the disk, and said disk C has rigidly secured to it a short shaft or axis $c$, upon which the planting-wheel rotates. The other disk C' is centrally bored and provided with a hub $d$, which receives the shaft or axis $c$, which may be fitted therein in any suitable manner. The inner face of the disk C' is plain, except that it has formed with it or secured thereon, as desired, suitable cams E and E', one of which is arranged in a higher plane than the other, the cam E being designed to engage and positively operate the plungers in the planting-tubes carried by the planting-wheel, as I shall presently describe.

The planting-wheel G is mounted upon the shaft or axis $c$, so as to rotate freely thereon, and is interposed between the two fixed disks C and C', as shown in Fig. 2. This wheel G has its periphery provided with a number of radially-arranged planting-tubes H, having conical outer ends $g$, while their inner ends are let into the rim of the wheel a sufficient distance to form a communication with one side of corresponding grooves $h$, formed in the side of the wheel adjacent to the disk C, so that these grooves may be aligned with the discharge end of the tube D to convey the seed from said tube D to the planting-tubes on the periphery of the wheel. The face of the wheel G, which is grooved, is also provided with a flange $l$, against which the rim of the disk C fits to separate the disk from the adjacent face of the wheel, whereby said wheel may freely rotate and the seed be prevented from dropping out between the side of the wheel and the disk. The opposite side of the wheel G is deeply recessed to form a chamber I, within which the plungers J are mounted and the hub G' of the wheel has secured to it blocks K, provided with slotted arms L, extending to the inner circumference of the chamber I, the said blocks K being bored to receive the inner ends of the plungers, and the slots in the arms L being for the purpose of receiving lugs or pins $n$, projecting laterally from the plungers through the slots and adapted to be engaged by the cams E on the inner face of the disk C', whereby the plungers are raised. The outer ends of the plungers are conically formed to fit the conical ends of the planting-tubes, and they project slightly beyond said tubes and close the outlets therefrom to prevent the discharge of the seed until the cams E raise the plungers and uncover or open said ends. Springs M are fitted around the stems of the plungers between the inner circumference of the chamber I and the blocks K, and serve to project the plungers downward after they have been released by the cam E.

Any desired number of tubes, plungers, and actuating mechanism may be used without departing from the spirit of my invention, and the plungers pass through holes in the periphery of the wheel G, so that they intersect the grooves on the opposite face or side of the wheel and enter the upper end of the planting-tubes, substantially as shown in Fig. 2.

From this description it will be seen that when the planter is in operation the ends of the planting-tubes, which are normally closed by the plungers, are forced into the ground by the rotation of the planting-wheel G, from which they project to form the pocket or hole for the reception of the seed. As the wheel G rotates the cam E operates upon each plunger to lift the conical or valve end thereof out of the end of its tube, thus thereby enabling the seed within the tube to escape around the conical end of the plunger and fall into the pocket or hole in the ground made by the tubes.

From the seed-hopper above, the gum tube projects downward into the upper end of the seed-tube D in disk C. By the use of revolving disks in the bottom of the seed-hopper described in Letters Patent to John S. Davis and Daniel S. Troy, No. 413,613, dated October 22, 1889, or by other well-known means, one or more seeds is taken from the seed-hopper and caused to drop through the gum tube into the tube D in the disk C, and thence into the planting-tube H, and the revolving disks in the bottom of the seed-hopper or other suitable device are so adjusted that the number of seed desired for each hole made by a planting-tube will drop from the seed-hopper through the gum tube and through the tube in the disk C and into the planting-tube, as each planting-tube, by the rotation of the planting-wheel, comes into alignment with the tube in the disk C. As the planting-wheel G rotates, the projecting tubes H are successively pushed into the ground. The depth to which they penetrate may be increased by placing a weight on the bars B, and too great penetration may be prevented by a collar or other device encircling each planting-tube. When a planting-tube has reached its greatest penetration into the ground, the cam E operates upon the plunger of such tube to lift the conical or valve end thereof out of the outlet at the end of such planting-tube, thereby enabling the seed in the planting-tube to drop past the conical end of the plunger into the hole in the ground made by the planting-tube. The cam E is so placed that the rotation of the planting-wheel releases the lug or pin $n$ of the plunger from the cam E, and the plunger is again pressed outward by the spring M, thus closing the outlet at the end of the planting-tube before the planting-tube leaves the ground, and thereby preventing earth from entering the planting-tube. When the planting-tube, by the continued rotation of the planting-wheel, leaves the ground, the loose earth around the hole falls in and covers the seed; or, if desired, the seed may be covered in any other manner, as by drag-brush or harrow.

The cam E', which, as before stated, is arranged in a plane to one side of the plane of the cam E, is designed as a stop or support for the plunger, should the other outer projecting end thereof strike a stone or other hard surface as the planting-tube reaches the ground and before depositing its charge of seed. This result is accomplished by the lugs or pins $n$ on the plungers traveling against or slightly below the under surface of the cam.

The machine, when constructed as previously described, is simple and effective and performs its work in a very satisfactory manner.

Having thus described my invention, what I claim as new, and desire to secure by Letters Patent, is—

1. In a seeder and planter, the combination of a frame carrying fixed disks, one of which has an opening through it for the passage of the seed from the hopper, a wheel mounted to freely revolve between said disks, and having seed-passages adapted to receive the seed from the seed-passage in the disk, planting-tubes projecting from the rim of the wheel, having their inner ends communicating with the seed-passages, plungers in the tubes controlling the outlets therefrom, and fixed cams adapted to raise the plungers as the wheel revolves, substantially as described.

2. In a seeder and planter, a frame having disks secured to its inner sides, and a wheel adapted to freely revolve between said disks, in combination with seed-conveying tubes having conical outer ends adapted to enter the soil to form a pocket or hole for the seed, plungers operating in said tubes to control the discharge therefrom, a passage adapted to convey seed to the tubes, and means for raising the plungers to permit the seed to be deposited, substantially as described.

3. In a seeder and planter, a frame, the disks carried thereby, one of which has a fixed shaft or axis, and a seed-passage, in combination with a wheel mounted to rotate freely on said axis, and having one of its sides grooved to form seed-conducting passages, tubes projecting through the rim of said wheel into which the seed-passages lead, plungers in said tubes controlling the discharge therefrom, and fixed cams for raising the plungers as the wheel revolves.

4. In a seeder and planter, the combination of a wheel adapted to rotate, having one of its faces formed with seed-conducting passages which receive seed from a hopper, and its opposite face formed with a recess or chamber, seed-tubes communicating with the seed-passages and projecting through the rim of the wheel, spring-actuated plungers in the recess or chamber, having their lower ends controlling the discharge ends of the tubes, and means for raising the plungers to permit the escape of the seed in the tubes, substantially as described.

5. The frame consisting of parallel bars, the fixed disks C and C', carried by the frame, said disk C, having a seed-conducting passage adapted to receive seed from a hopper above it, and a shaft or axis, and the disk C', having cams on its inner face, in combination with a wheel between the disks and mounted on said axis whereby it may freely revolve, said wheel having one of its sides grooved to form passages for the seed, spring-actuated plungers in the recessed opposite face of said wheel, having lugs engaged by said cams, and tubes projecting through the rim of the wheel, said tubes having their upper ends communicating with the seed-passages, and their lower end cone-shaped and controlled by the plungers, substantially as described.

6. In a seeder and planter, the combination of its disks, a wheel adapted to rotate between said disks, a flange projecting from one of the faces of the wheel against which one of the disks is fitted, seed-tubes carried by the wheels and receiving seed from a hopper through the seed-passage in one of the disks, plungers in the tubes controlling the discharge therefrom, and means for operating the plungers, substantially as described.

JOHN S. DAVIS.

Witnesses:
W. D. PECK,
ROBT. GOLDTHWAITE.